United States Patent
Pedersen et al.

(10) Patent No.: US 9,946,408 B2
(45) Date of Patent: Apr. 17, 2018

(54) COMMUNICATION BETWEEN A MASTER ACTIVE STYLUS AND A SLAVE TOUCH-SENSOR DEVICE

(75) Inventors: Trond Jarle Pedersen, Trondheim (NO); Vemund Kval Bakken, Menlo Park, CA (US)

(73) Assignee: Atmel Corporation, Chandler, AZ (US)

( * ) Notice: Subject to any disclaimer, the term of this patent is extended or adjusted under 35 U.S.C. 154(b) by 327 days.

(21) Appl. No.: 13/326,981

(22) Filed: Dec. 15, 2011

(65) Prior Publication Data
US 2013/0106760 A1    May 2, 2013

Related U.S. Application Data

(60) Provisional application No. 61/553,114, filed on Oct. 28, 2011.

(51) Int. Cl.
| G06F 3/041 | (2006.01) |
|---|---|
| G06F 3/044 | (2006.01) |
| G06F 3/0354 | (2013.01) |
| G06F 3/046 | (2006.01) |
| G06F 3/047 | (2006.01) |

(52) U.S. Cl.
CPC .......... G06F 3/044 (2013.01); G06F 3/03545 (2013.01); G06F 3/046 (2013.01); G06F 3/047 (2013.01); G06F 3/0416 (2013.01)

(58) Field of Classification Search
CPC .... G06F 3/03545; G06F 3/041; G06F 3/0412; G06F 3/044
USPC ...................... 345/173–183; 178/18.01–20.04
See application file for complete search history.

(56) References Cited

U.S. PATENT DOCUMENTS

| 4,695,680 A | 9/1987 | Kable |
|---|---|---|
| 5,973,677 A | 10/1999 | Gibbons |
| 5,977,958 A * | 11/1999 | Baron ................... G06F 3/0433 |
| | | 178/19.01 |
| 6,259,437 B1 * | 7/2001 | Onodaka et al. ............ 345/174 |
| 7,612,767 B1 | 11/2009 | Griffin |
| 7,663,607 B2 | 2/2010 | Hotelling |

(Continued)

FOREIGN PATENT DOCUMENTS

WO    WO 2012/129247    9/2012

OTHER PUBLICATIONS

Kyung, Ki-Uk et al., "wUbi-Pen : Windows Graphical User Interface Interacting with Haptic Feedback Stylus," *SIGGRAPH*, Los Angeles, California, Aug. 2008.

(Continued)

*Primary Examiner* — Roberto Flores
(74) *Attorney, Agent, or Firm* — Baker Botts L.L.P.

(57) ABSTRACT

In one embodiment, a system comprises a stylus and a touch sensor. The stylus is operable to transmit a first signal. The touch sensor comprises a first plurality of electrode lines and a controller. Each electrode line is operable to sense the first signal transmitted by a stylus. The stylus tip of the stylus is located at a position relative to the first plurality of electrode lines at the time of transmission of the first signal. The controller is operable to measure a voltage, charge, or capacitance of the sensed first signal on each electrode line of the first plurality of electrode lines and estimate the position of the stylus tip based on interpolation of the measured voltages on each electrode line of the first plurality of electrode lines.

15 Claims, 12 Drawing Sheets

(56) References Cited

U.S. PATENT DOCUMENTS

| | | | |
|---|---|---|---|
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,278,571 B2* | 10/2012 | Orsley | 178/18.03 |
| 2002/0189869 A1* | 12/2002 | Yeh | 178/18.01 |
| 2004/0095333 A1* | 5/2004 | Morag et al. | 345/173 |
| 2006/0279548 A1* | 12/2006 | Geaghan | 345/173 |
| 2008/0238885 A1 | 10/2008 | Zachut | |
| 2009/0095540 A1 | 4/2009 | Zachut | |
| 2009/0115725 A1 | 5/2009 | Shemesh | |
| 2009/0127005 A1 | 5/2009 | Zachut | |
| 2009/0153152 A1 | 6/2009 | Maharyta | |
| 2009/0184939 A1 | 7/2009 | Wohlstadter | |
| 2009/0251434 A1 | 10/2009 | Rimon | |
| 2009/0283342 A1* | 11/2009 | Schediwy | G06F 3/044 178/19.03 |
| 2009/0315854 A1 | 12/2009 | Matsuo | |
| 2010/0006350 A1 | 1/2010 | Elias | |
| 2010/0155153 A1 | 6/2010 | Zachut | |
| 2010/0170726 A1* | 7/2010 | Yeh et al. | 178/19.03 |
| 2010/0252335 A1* | 10/2010 | Orsley | 178/18.03 |
| 2010/0292945 A1 | 11/2010 | Reynolds | |
| 2010/0315384 A1 | 12/2010 | Hargreaves | |
| 2011/0007029 A1 | 1/2011 | Ben-David | |
| 2012/0105361 A1* | 5/2012 | Kremin et al. | 345/174 |
| 2012/0105362 A1* | 5/2012 | Kremin | G06F 3/03545 345/174 |
| 2012/0182254 A1* | 7/2012 | Jang | G06F 3/03545 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2012/0327041 A1 | 12/2012 | Harley | |

OTHER PUBLICATIONS

Lee, Johnny C. et al., "Haptic Pen: A Tactile Feedback Stylus for Touch Screens," *UIST* '04, vol. 6, Issue 2, Santa Fe, New Mexico, Oct. 2004.

Song, Hyunyoung et al., "Grips and Gestures on a Multi-Touch Pen," *CHI* 2011, *Session: Flexible Grips & Gestures*, Vancouver, BC, Canada, May 2011.

Tan, Eng Chong et al., "Application of Capacitive Coupling to the Design of an Absolute-Coordinate Pointing Device," IEEE Transactions on Instrumentation and Measurement, vol. 54, No. 5, Oct. 2005.

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

COMMUNICATION BETWEEN A MASTER ACTIVE STYLUS AND A SLAVE TOUCH-SENSOR DEVICE

RELATED APPLICATION

This application claims the benefit, under 35 U.S.C. § 119(e), of U.S. Provisional Patent Application No. 61/553,114, filed 28 Oct. 2011, which is incorporated herein by reference.

TECHNICAL FIELD

This disclosure generally relates to touch-position sensors.

BACKGROUND

A touch-position sensor, or a touch sensor, may detect the presence and location of an object or the proximity of an object (such as a user's finger or a stylus) within a touch-sensitive area of the touch sensor overlaid, for example, on a display screen. In a touch sensitive display application, the touch position sensor may enable a user to interact directly with what is displayed on the screen, rather than indirectly with a mouse or touch pad. A touch sensor may be attached to or provided as a part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch-position sensors, such as, for example, resistive touch screens, surface acoustic wave touch screens, and capacitive touch screens. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
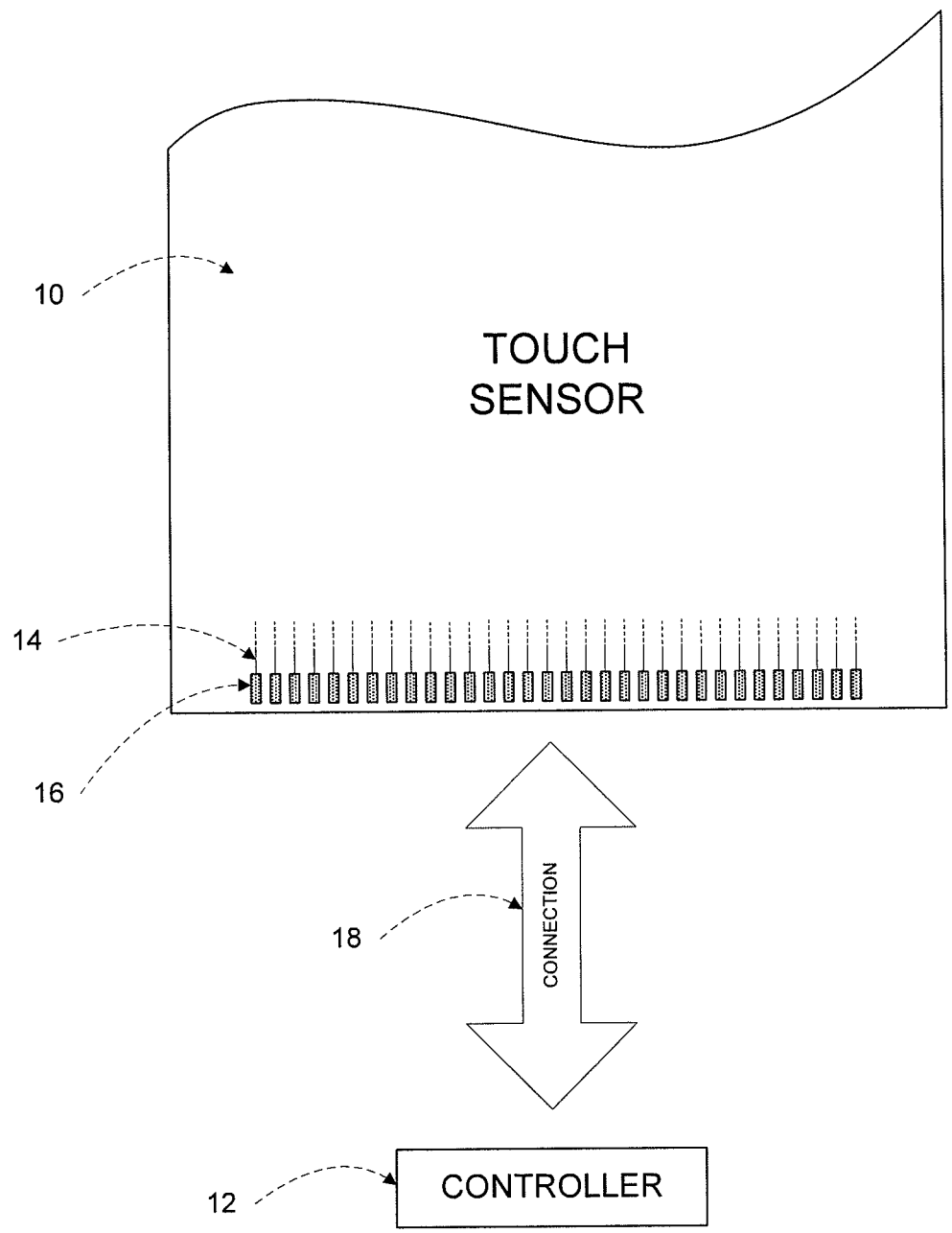
FIG. 1 illustrates an example touch sensor.

FIG. 1 illustrates an example touch sensor 10 with an example controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% of the area of its shape. As an example and not by way of limitation, an electrode may be made of fine lines of metal or other conductive material (such as for example copper, silver, or a copper- or silver-based material) and the fine lines of conductive material may occupy substantially less than 100% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs) or digital signal processors (DSPs)) of a device that includes touch sensor 10 and touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). In some embodiments, connection 18 may include conductive lines on the FPC coupling touch-sensor controller 12 to connection pads 16, in turn coupling touch-sensor controller 12 to tracks 14 and to the drive or sense electrodes of touch sensor 10. In other embodiments, connection pads 16 may be inserted into an electro-mechanical connector (such as a zero insertion force wire-to-board connector). In these embodiments, connection 18 may not need to include an FPC. This disclosure contemplates any suitable connection 18 between touch-sensor controller 12 and touch sensor 10.

Figure 2:
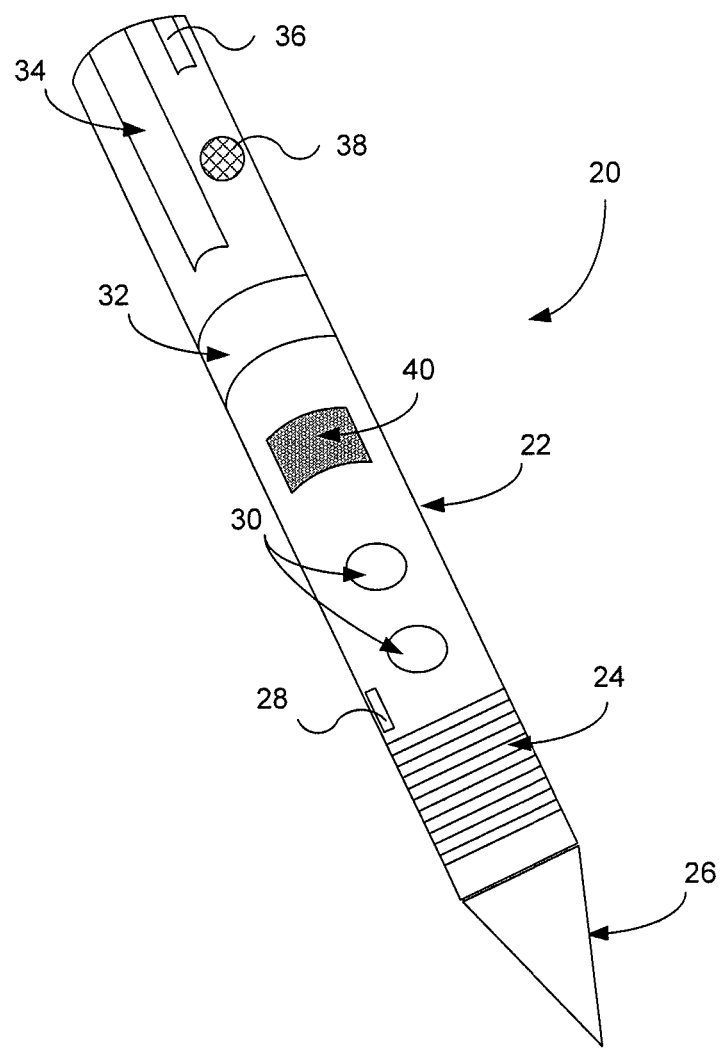
FIG. 2 illustrates an example active stylus exterior.

FIG. 2 illustrates an example exterior of an example active stylus 20. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or electrophoretic ink (E-Ink). As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may provide or communicate pressure information (e.g., the amount of pressure being exerted by active stylus 20 through tip 26) between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
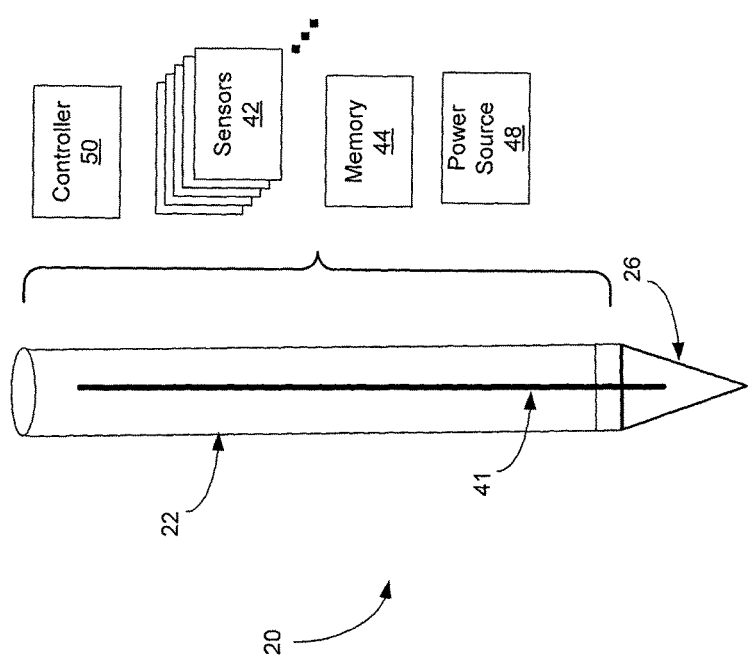
FIG. 3 illustrates an example active stylus interior.

FIG. 3 illustrates example internal components of example active stylus 20. Active stylus 20 includes one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example and without limitation, via a radio frequency (RF) communication link. In this case, active stylus 20 includes a RF device for transmitting data over the RF link.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered by a wired connection through an applicable port coupled to a suitable power source.

Figure 4:
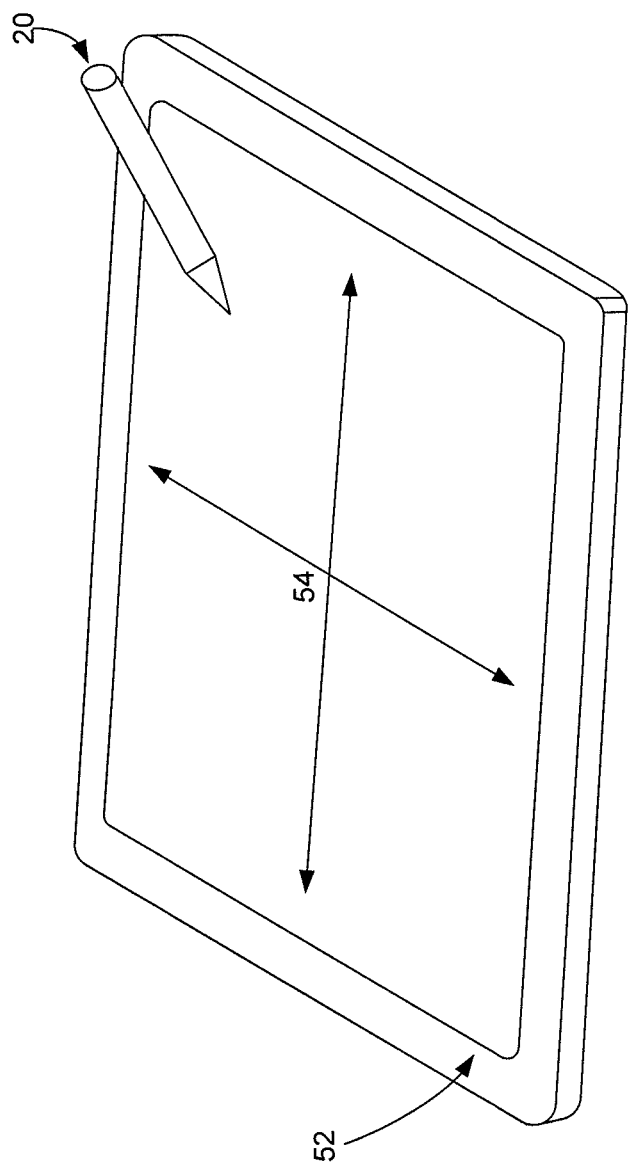
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

As described above in connection with FIG. 1, in particular embodiments, a touch sensor (e.g., touch sensor 10 illustrated in FIG. 1) may include an array of drive and sense electrodes or an array of electrodes of a single type. These electrodes may be coupled to a controller (e.g., controller 12 illustrated in FIG. 1) by specific tracks (e.g., tracks 14 illustrated in FIG. 1).

Touch sensor 10 may operate in at least two modes of operation, labeled for convenience purposes only as "master" mode and "slave" mode. The name "master" mode refers to a mode of operation of touch sensor 10 in which touch sensor 10 transmits signals through drive lines and senses a change in capacitance. In some embodiments, the change in capacitance in "master" mode may be caused by the presence of a finger or by the presence of active stylus 20, which performs operations in reaction to the transmitted signals. The name "slave" mode refers to a mode of operation of touch sensor 10 in which touch sensor 10 waits for active stylus 20 to generate and transmit signals and then performs operations in response to receiving signals from active stylus.

Figure 5:
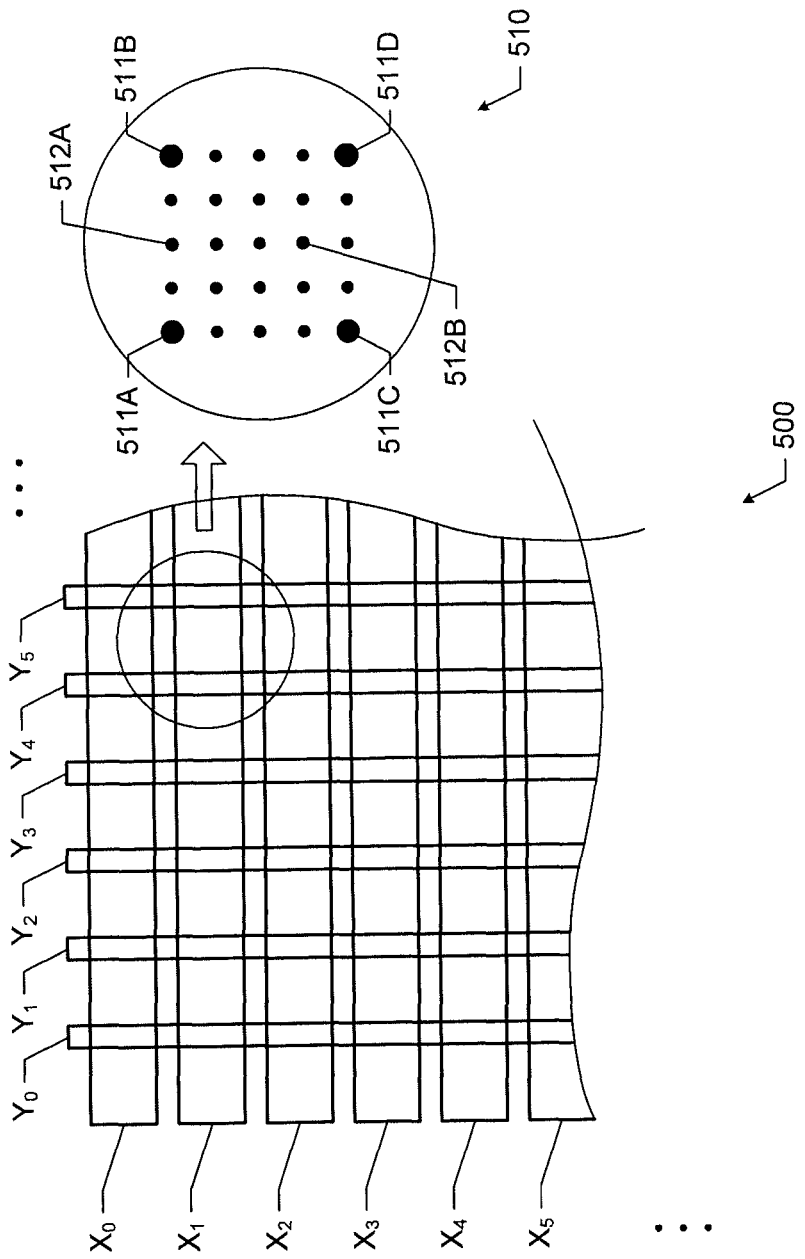
FIG. 5 illustrates an example array of electrodes.

In "master" mode, the drive unit of the controller may supply drive signals to the drive electrodes through some tracks, and the sense unit of the controller may sense charge at the capacitive nodes through other tracks. The electrodes may be arranged in various patterns and this disclosure contemplates any suitable patterns for the electrode arrangements. For example, FIG. 5 illustrates an example array of electrodes arranged in a X-Y grid pattern. In particular embodiments, the drive electrodes may be arranged along one set of lines (e.g., the X-lines: $X_0$ to $X_n$) and the sense electrodes may be arranged along another set of lines (e.g., the Y-lines: $Y_0$ to $Y_n$). The capacitive nodes are at one or more intersections of the X and Y-lines. A touch-sensitive area 500 may be populated with these electrodes.

In particular embodiments, to determine the location of an object, such as a stylus or a user's finger, within a touch-sensitive area (e.g., touch-sensitive area 500), a scan of the electrodes or coordinates within the touch-sensitive area may be performed (e.g., driving the drive electrodes and scanning the capacitive nodes within touch-sensitive area 500). In some implementations, the drive electrodes are driven one line at a time. More specifically, a number of pulses (e.g., 3 or 4 pulses) is sent along each line of drive electrodes (e.g., each X line), and for each pulse, a number of signal samples (e.g., 1 or 2 samples) is read by scanning the corresponding capacitive nodes along that line. For example, in FIG. 5, the drive electrodes along the $X_0$ line may be driven first, and the corresponding capacitive nodes along the $X_0$ line may be scanned to take the signal samples. Then, the drive electrodes along the $X_1$ line are driven next, and the corresponding capacitive nodes along the $X_1$ line are scanned to take the signal samples. And so on, until the electrodes along the last line, $X_n$, are driven and the corresponding capacitive nodes along the $X_n$ line are scanned to take the signal samples. The samples may be digitally quantized (e.g., via an analog-to-digital converter (ADC)). The digital samples are then transmitted in individual frames. In particular embodiments, a frame includes a full scan of some or all the capacitive nodes within a touch-sensitive area. As an example, in the case illustrated in FIG. 5, a frame includes [M×N] samples, where N denotes the number of X-lines (e.g., drive lines) and M denotes the number of pulses sent along each X line.

In the example grid of electrodes illustrated in FIG. 5, the capacitive nodes are at the intersections of the drive and scan electrodes. Using a small section 510 of touch-sensitive area 500 to simplify the discussion, section 510 includes 4 capacitive nodes 511A, 511B, 511C, 511D. When a stylus moves around touch-sensitive area 500, it may be at a coordinate coincide with one of the capacitive nodes or it may be at a coordinate in between a number of capacitive nodes. For example, coordinate 512A is mostly in between nodes 511A and 511B, whereas coordinate 512B is in between nodes 511A, 511B, 511C, and 511D. A touch-sensor device is often able to determine more distinct coordinates within its touch-sensitive area than the actual number of capacitive nodes included in the touch-sensitive area. This is because coordinates in between the capacitive nodes can also be detected.

In some implementations, the capacitive nodes are scanned to measure the signals (e.g., voltage levels) at these nodes. The signal for each coordinate is interpolated using the signals measured at the capacitive nodes near that coordinate. In some implementations, if a capacitive node is nearer a specific coordinate, then that capacitive node has more influence on the coordinate. Conversely, if a capacitive node is farther away from a specific coordinate, then that capacitive node has less influence on the coordinate.

In the example case illustrated in FIG. 5, for coordinate 512A, since it is located mainly in between capacitive nodes 511A and 511B, the signals from capacitive nodes 511A and 511B have more influence on coordinate 512A. Furthermore, since coordinate 512A is located approximately halfway in between capacitive nodes 511A and 511B, the signal influence of capacitive nodes 511A and 511B on coordinate 512A is about the same. Thus, the signal at coordinate 512A may be interpolated as 50% of the signal measured at capacitive nodes 511A plus 50% of the signal measured at capacitive nodes 511B. In addition, since capacitive nodes 511C and 511D are somewhat near coordinate 512A, their influence may also be taken into consideration when interpolating and calculating the signal at coordinate 512A (e.g., 45% of the signal measured at capacitive nodes 511A+45% of the signal measured at capacitive nodes 511B+5% of the signal measured at capacitive nodes 511C+5% of the signal measured at capacitive nodes 511D). Similarly, for coordinate 512B, its signal may be calculated by interpolating the signals measured at capacitive nodes 511A, 511B, 511C, and 511D since this coordinate is located in between these 4 capacitive nodes. Furthermore, since coordinate 512B is closer to capacitive nodes 511C and 511D than capacitive nodes 511A and 511B, capacitive nodes 511C and 511D have more influence on coordinate 512B than capacitive nodes 511A and 511B (e.g., 12.5% of the signal measured at capacitive nodes 511A+12.5% of the signal measured at capacitive nodes 511B+37.5% of the signal measured at capacitive nodes 511C+37.5% of the signal measured at capacitive nodes 511D).

Thus, when an object (such as a finger or active stylus 20) touches or comes within proximity of a capacitive node (such as capacitive nodes 511A, 511B, 511C, and 511D), a change in capacitance may occur at the capacitive node, and a touch-sensor controller (such as touch-sensor controller 12) may measure the change in capacitance. By measuring changes in capacitance throughout the array, the touch-sensor controller may determine the position of the touch or proximity within the touch-sensitive area(s).

In some embodiments, "master" mode may include a "touch" mode and/or an "anti-touch" mode. Generally, when a human finger touches or comes within proximity of a capacitive node, the touch-sensor controller may measure a decrease in capacitance of the capacitive node. In some embodiments, active stylus 20 may be configured to decrease capacitance of a capacitive node when active stylus 20 touches or comes within proximity of the capacitive node. This configuration of active stylus 20 may be referred to as "touch" mode because, in this configuration, active stylus 20 may resemble the "touch" of a human finger by decreasing capacitance of a capacitive node. In other embodiments, active stylus 20 may be configured to increase capacitance of a capacitive node when active stylus 20 touches or comes within proximity of the capacitive node. This configuration of active stylus 20 may be referred to as "anti-touch" mode because, in this configuration, active stylus 20 does not resemble the "touch" of a human finger. In some embodiments, active stylus 20 is equipped to operate in both touch and anti-touch modes. For example, in some embodiments, a user may choose between touch and anti-touch mode by inputting a selection through buttons 30 or sliders 32 or 34.

In "slave" mode, touch sensor 10 waits for active stylus 20 to generate and transmit signals and then performs operations in response to receiving signals from active stylus. In this mode, the electrodes of touch sensor 10 sense signals from active stylus 20. In one example embodiment, touch sensor 10 includes an array of electrodes of a single type (e.g., the X and Y-lines of FIG. 5 having electrodes of all the same type), each electrode being capable of sensing signals. In another example embodiment, touch sensor 10 includes an array of drive electrodes (e.g., the X-lines: $X_0$ to $X_n$) and sense electrodes (e.g., the Y-lines: $Y_0$ to $Y_n$), but only the sense electrodes are used in "slave" mode. In yet another example embodiment, touch sensor 10 includes an array of drive and sense electrodes, and the drive electrodes switch to a sensing mode of operation. For example, the drive electrodes may toggle between a driving mode and a sensing mode such that touch sensor 10 may operate in both "master" and "slave" mode. In some embodiments, the ability to operate in both "master" and "slave" mode may provide a mechanism for distinguishing between input from a stylus (e.g., active stylus 20) and a human finger.

Certain embodiments recognize that the "slave" mode may achieve certain benefits. In one example embodiment, touch sensor 10 does not transmit signals to active stylus 20 in "slave" mode, which may allow touch sensor 10 to save power and energy. In addition, "slave" mode may provide native palm suppression because "slave" mode does not monitor capacitive nodes for changes in capacitance while in "slave" mode. If "master" mode is turned off, then in some embodiments, touches by a human finger or palm does not cause changes in capacitance that would result in a detectable touch. Furthermore, "slave" mode may reduce the cost and/or size of active stylus 20 because active stylus 20 does not need components for sensing signals in "slave" mode.

In some embodiments, touch sensor 10 may use both the X-lines ($X_0$ to $X_n$) and the Y-lines ($Y_0$ to $Y_n$) of FIG. 5 to sense signals from active stylus 20. In one example embodiment, the X-lines and the Y-lines sense signals simultaneously. In other embodiments, the X and Y-lines operate sequentially. For example, the X-lines may sense a first signal while the Y-lines wait, and then the Y-lines may sense a subsequent signal after the X-lines are finished.

Figure 6:
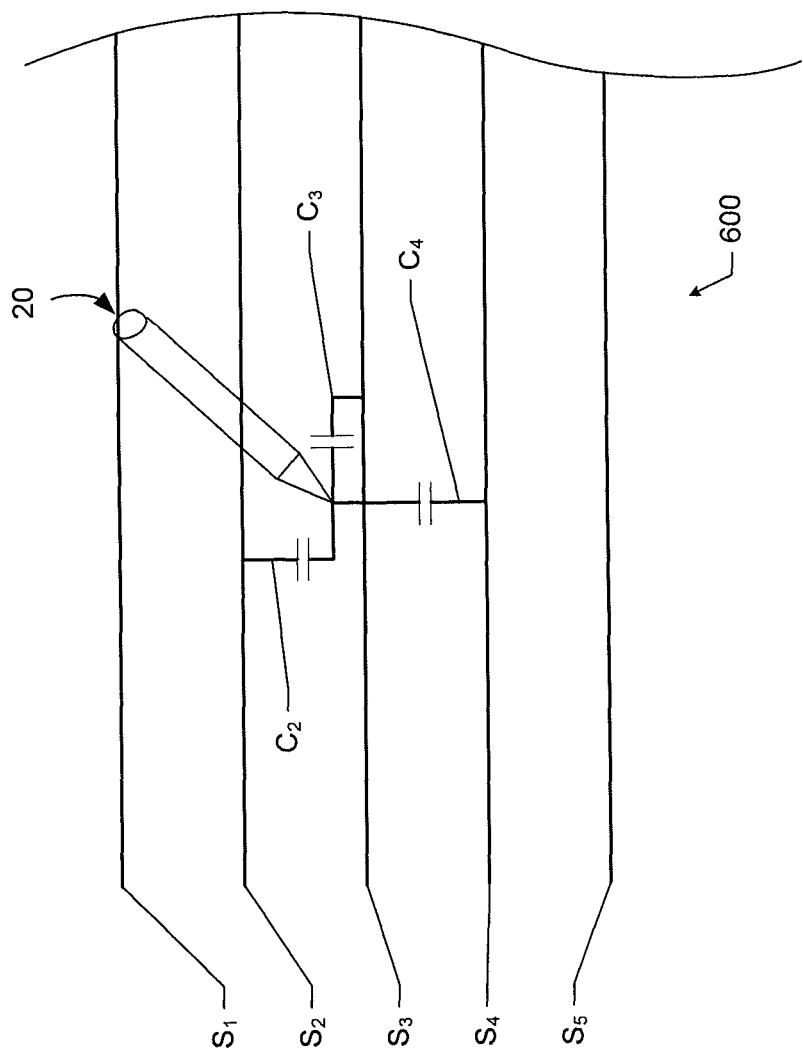
FIG. 6 shows a touch sensitive area having electrodes arranged along a set of lines according to one example embodiment.

FIG. 6 shows a touch sensitive area 600 having electrodes arranged along a set of S-lines (e.g., the S-lines: $S_1$ to $S_5$) according to one example embodiment. Examples of the S-lines of FIG. 6 may include the X-lines or Y-lines of FIG. 5. In the example of FIG. 6, active stylus 20 touches touch sensitive area 600 between sense lines $S_2$ and $S_3$.

In some embodiments, active stylus 20 is configured to continuously transmit a signal that may be detected by the S-lines. In the example of FIG. 6, active stylus 20 is equipped with a voltage pump, an oscillator, and a switch. The voltage pump may pump a high voltage signal, the oscillator may generate a waveform such as a square wave or a sine wave, and the switch may toggle potential of stylus tip 26 between zero voltage and a maximum voltage. Active stylus 20 may transmit a signal, such as a square wave or sine wave, that may be sensed by the S-lines. In the example of FIG. 6, S-lines $S_2$ through $S_4$ sense a signal from active stylus 20. The capacitance between active stylus 20 and S-lines $S_2$ through $S_4$ is shown as capacitances $C_2$ through $C_4$.

Figure 7:
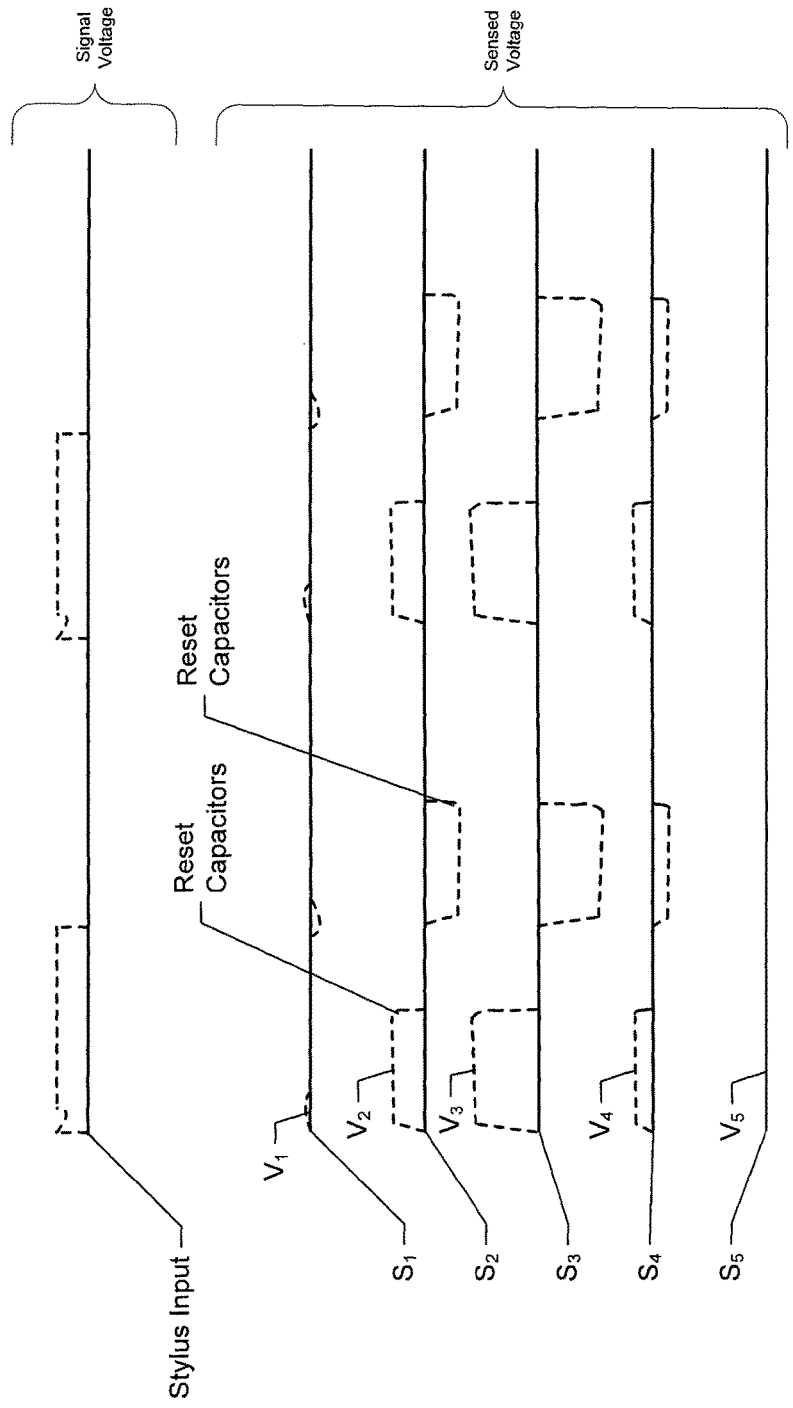
FIG. 7 shows the voltage of a signal from an active stylus plotted against voltages on the lines of electrodes of FIG. 6.

FIG. 7 shows the voltage of a signal from active stylus 20 plotted against voltages $V_1$ to $V_5$ sensed on the S-lines $S_1$ to $S_5$ of FIG. 6. In this example, active stylus 20 transmits two square-wave signal pulses. S-lines $S_1$ to $S_5$ sense the transmitted square-wave signal pulses.

As seen in the voltage plot of FIG. 7, voltage amplitude is highest on S-line $S_3$. The voltage amplitude is highest on $S_3$ because active stylus 20 touches touch sensitive area 600 closest to $S_3$. The voltage amplitude is weakest on S-lines $S_1$ and $S_5$ because these S-lines are furthest away from active stylus 20.

In the voltage plot of FIG. 7, S-line voltage increases when the square-wave pulse is received. This voltage may be stored in capacitors. When the capacitors are reset, the S-line voltage returns to baseline voltage. When the square-weave pulse terminates, the S-line voltage decreases. The S-line voltage returns to baseline voltage again when the capacitors are reset again.

In the example of FIG. 7, active stylus 20 transmits two square-wave signals (or signal pulses). In one example embodiment, a first set of S-lines may sense the first signal and a different second set of S-lines may sense the second signal. For example, the X-lines of touch sensitive area 500 may sense the first square wave pulse, and the Y-lines of touch sensitive area 500 may sense the second square wave pulse.

The location of active stylus 20 may be estimated by interpolating between the measured voltages. In the example of FIG. 7, interpolating voltages $V_2$ through $V_4$ may yield and estimated location of where active stylus 20 touched touch sensitive area 600. For illustration purposes, $V_2$, $V_3$, and $V_4$ may have non-dimensional values of 100, 200, and 75, and S-lines $S_2$, $S_3$, and $S_4$ may each be 10 non-dimensional units apart. Interpolating by fitting these three points to a parabolic equation provides an estimated location of 8.5 non-dimensional units from S-line $S_2$ (or 1.5 non-dimensional units from S-line $S_3$). Performing this interpolation again using a second signal sensed by a different second set of S-lines may yield an estimated location in two dimensions.

FIGS. 8A-8D show detection circuits 800A-800D according to example embodiments. Detection circuits 800A-800D detect and measure voltage, charge or capacitance on an S-line. In some embodiments, each S-line in a touch sensor includes a detection circuit such as detection circuits 800A-800D. By detecting and measuring voltage, charge or capacitance on each S-line, an estimated location of the touch from active stylus 20 may be interpolated from the measured voltages.

Figure 8A:
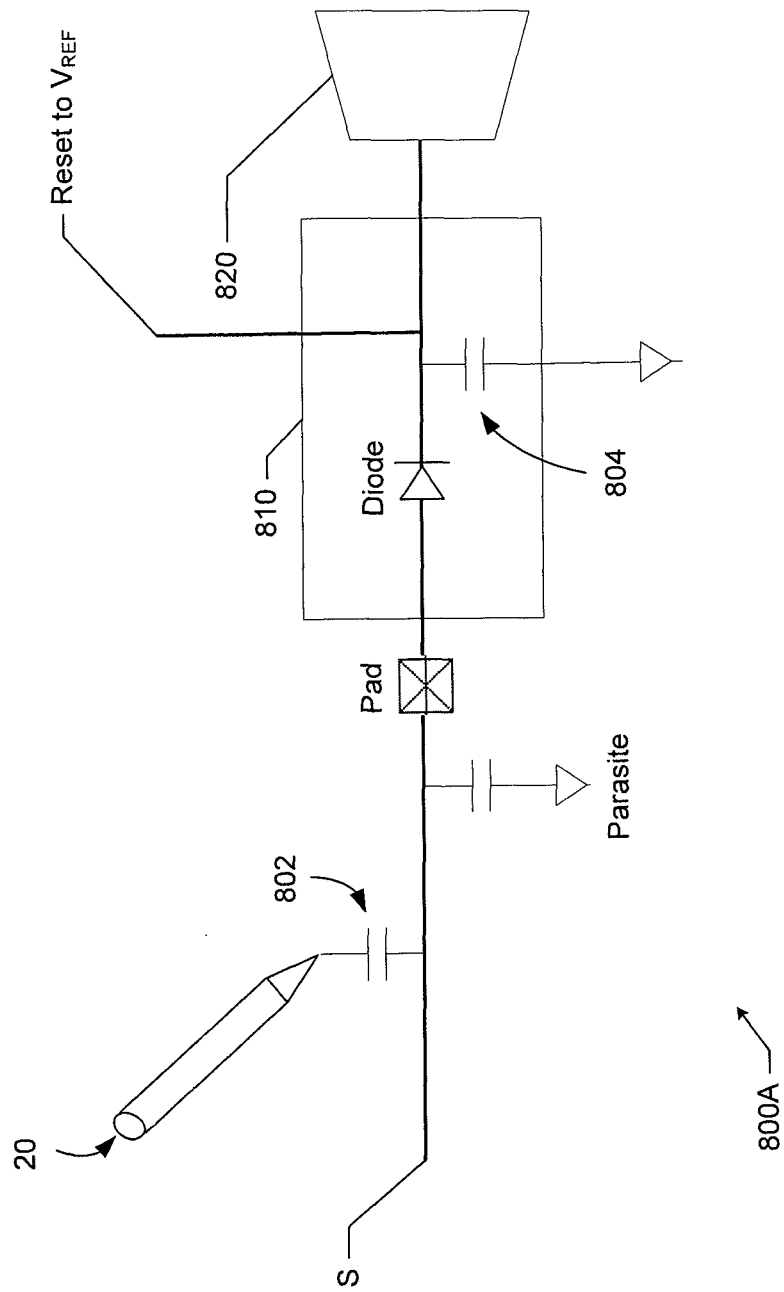
FIGS. 8A-8D show detection circuits according to example embodiments.

Detection circuit 800A shown in FIG. 8A features a peak detector 810 and an analog to digital convert (ADC) 820. Peak detector 810 detects a peak voltage transmitted across the S-line. In the example of FIG. 8A, peak detector 810 includes a simple diode and a measuring capacitor 804. ADC 820 converts an input analog voltage to a digital number proportional to the magnitude of the voltage. In operation, active stylus 20 transmits voltage to detection circuit 800A at coupling capacitance 802. Peak detector 810 measures the peak voltage across the S-line, and ADC 820 converts the peak voltage into a digital number.

Figure 8B:
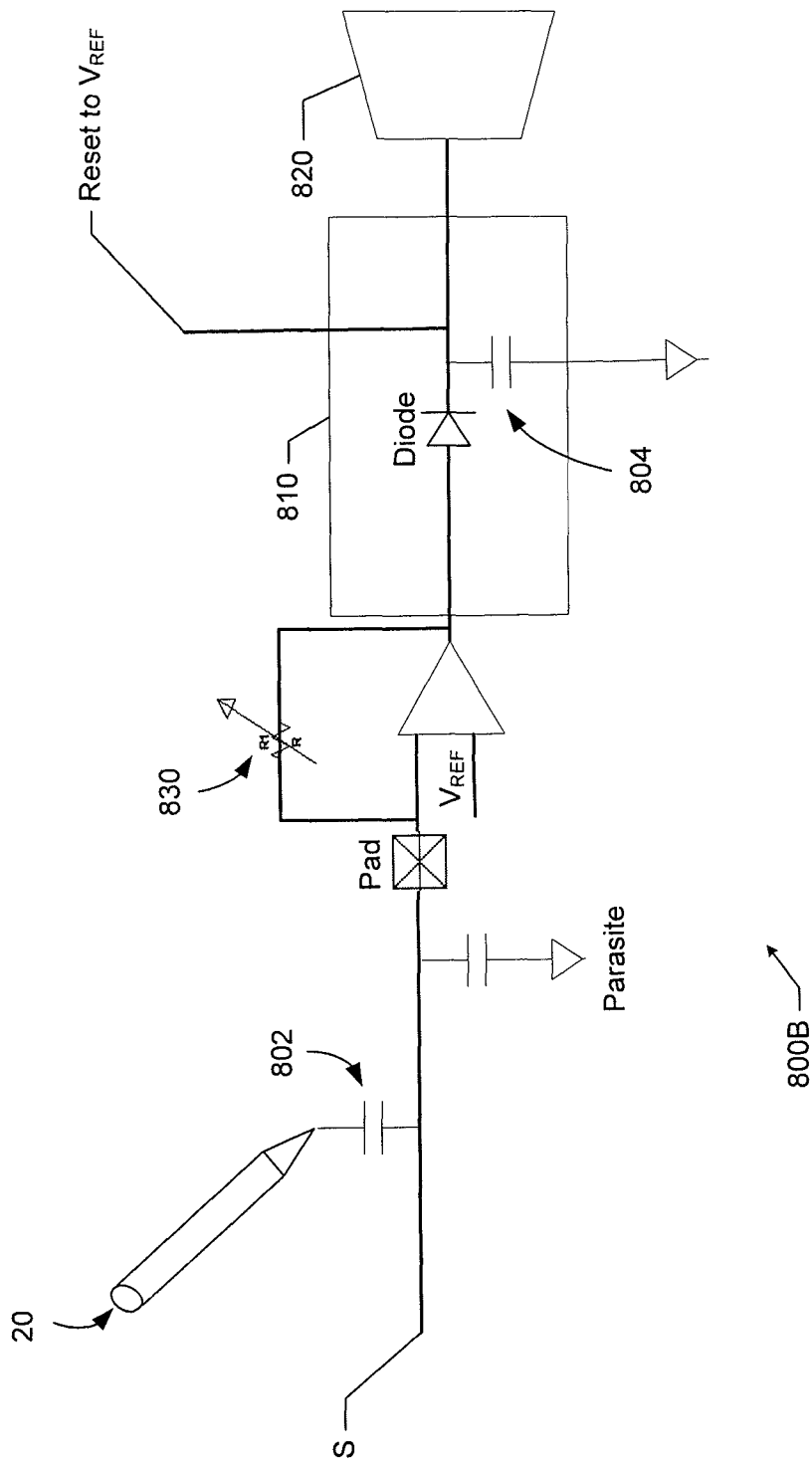

Detection circuit 800B shown in FIG. 8B features a current-to-voltage converter 830 between the pad and peak detector 810. In some embodiments, current-to-voltage converter 830 may have programmable gain settings to interact with screens with different properties.

Figure 8C:
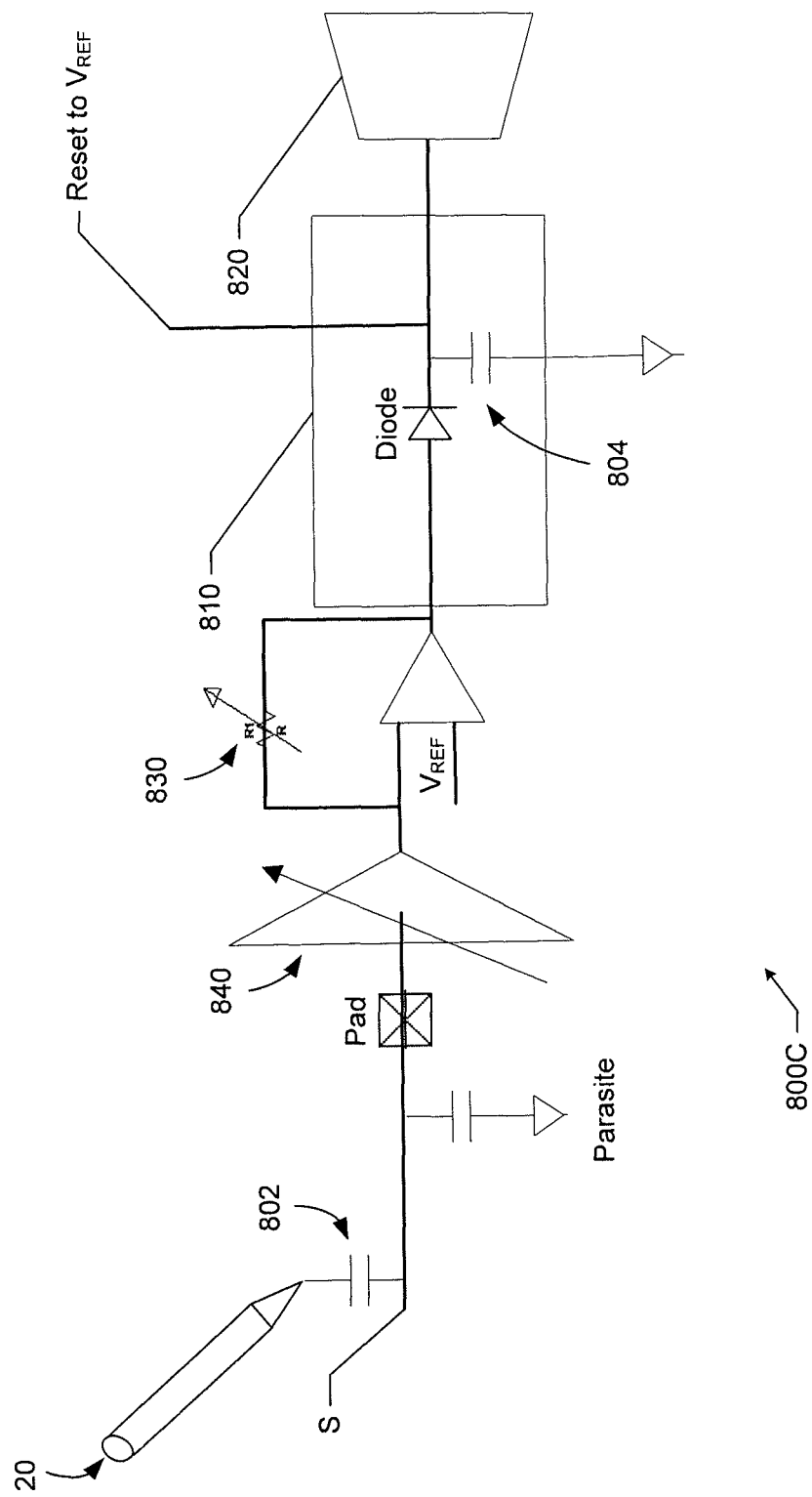

Detection circuit 800C shown in FIG. 8C features a current conveyor 840 between the pad and current-to-voltage converter 830. In some embodiments, current conveyor 840 may be provided for low-impedance input.

Figure 8D:
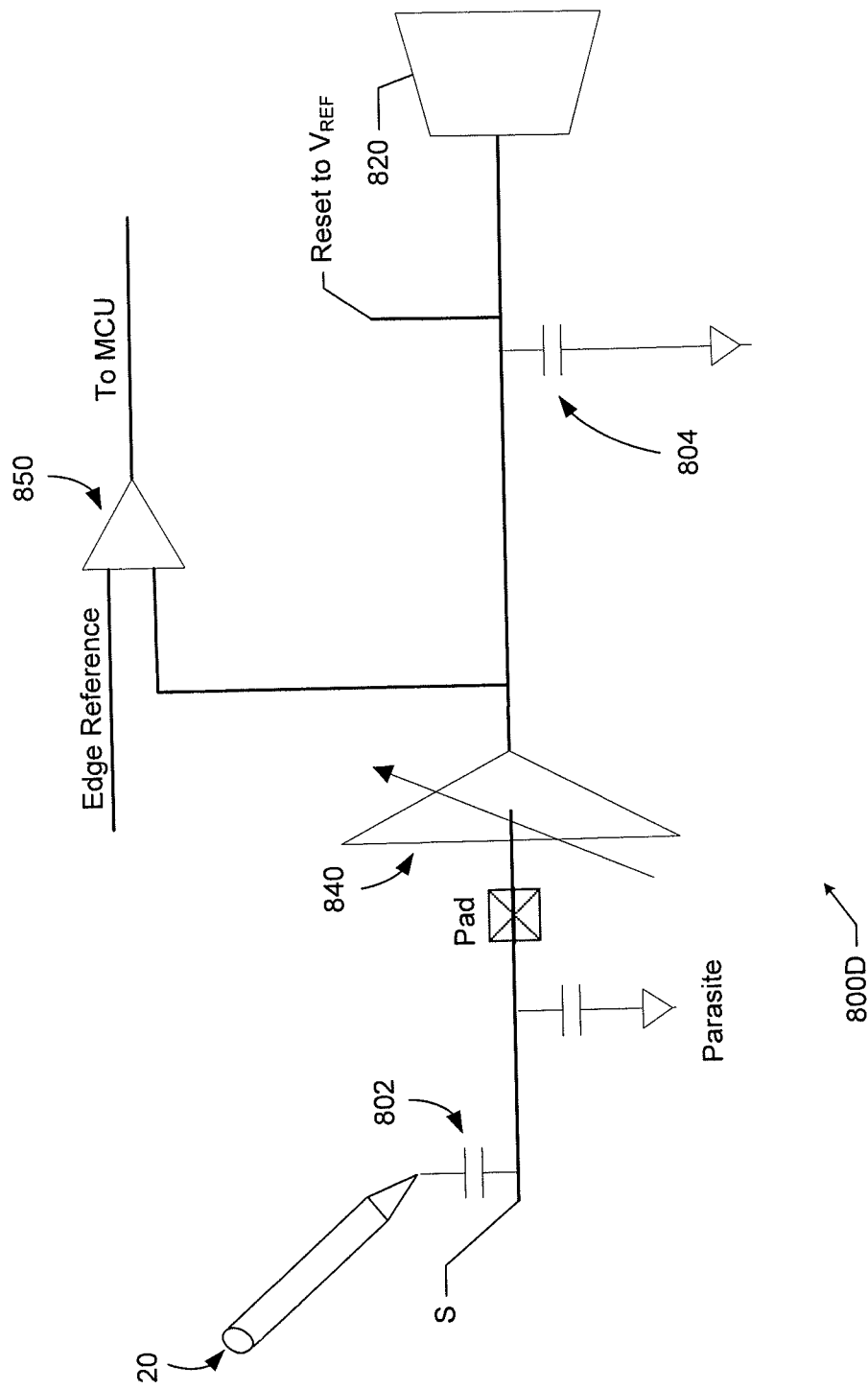

Detection circuit 800D shown in FIG. 8D features a comparator 850 instead of peak detector 810. Detection circuit 800D may be locked to the frequency of active stylus 20 and use this lock to sample the maximum voltage amplitude instead of using a peak detector. In detection circuit 800D, comparator 850 detects the edges of the signal and uses these edges to lock on the maximum signal.

Assuming that the frequency of active stylus 20 is either constant or known, detection circuit 800D may predict where the maximum signal where occur. Locking detection circuit 800D to active stylus 20 may simplify communication by using synchronous data transfer with a 1:1 communication rate (plus protocol overhead), whereas using a peak detector may require that the Nyquist-Shannon sampling theorem be upheld.

Figure 9:
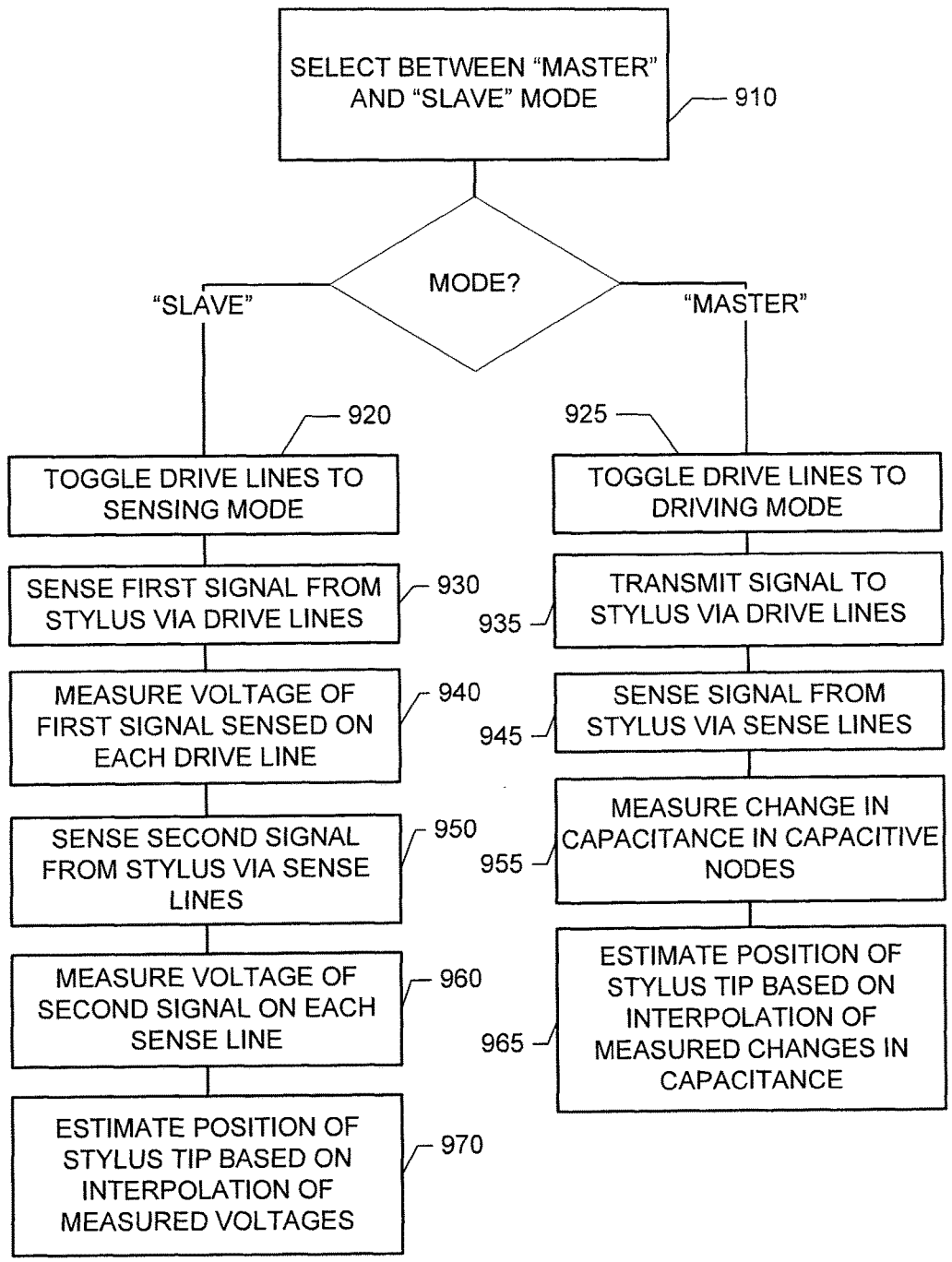
FIG. 9 illustrates an example method for communicating between an active stylus and a touch-sensor device.

FIG. 9 illustrates an example method for communicating between an active stylus and a touch-sensor device. The method starts at step 910, where an operating mode for touch sensor 10 is selected.

If "slave" mode is selected at step 910, then the X drive lines are toggled to sensing mode at step 920. At step 930, the X drive lines sense a first signal from active stylus 20. At step 940, controller 50 measures the sensed voltage on each drive line. At step 950, the Y drive lines sense a second signal from active stylus 20. In some examples, the second signal may be a second signal pulse. At step 960, controller 50 measures the sensed voltage on each sense line. At step 970, controller 50 estimates the position at which stylus tip 26 touched touch sensor 10 by interpolating the voltages measured from the drive and sense lines.

If "master" mode is selected at step 910, then the X drive lines are toggled to driving mode at step 925. At step 935, the X drive lines transmit a signal to active stylus 20. Active stylus 20 transmits a signal back to touch sensor 10 in response, and the transmitted signal is sensed by the Y sense lines at step 945. At step 955, controller 50 measures the change in capacitance of each capacitive node. At step 965, controller 50 estimates the position at which stylus tip 26 touched sensor 10 by interpolating the measured changes in capacitance of each capacitive node.

Particular embodiments may repeat the steps of the method of FIG. 9, where appropriate. Moreover, although this disclosure describes and illustrates particular steps of the method of FIG. 9 as occurring in a particular order, this disclosure contemplates any suitable steps of the method of FIG. 9 occurring in any suitable order. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Particular embodiments may repeat the steps of the method of FIG. 6, where appropriate. Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Herein, reference to a computer-readable non-transitory storage medium encompasses a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a combination of two or more of these, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   one or more processors;
   one or more memory units coupled to the one or more processors, the one or more memory units collectively storing logic, the logic configured to, when executed by the one or more processors, cause the one or more processors to perform operations comprising:
      measuring, on each of a first plurality of electrode lines of a touch sensor, a respective value associated with a first signal transmitted by a stylus at a first time and sensed on each electrode line of the first plurality of electrode lines for determining a position of the stylus in a first direction, the first plurality of electrode lines oriented in a second direction that is different than the first direction, each of the first plurality of electrode lines being configured to sense the first signal transmitted by the stylus at the first time, the stylus having a stylus tip located at a position relative to the first plurality of electrode lines at the time of transmission of the first signal;
      measuring, on each of a second plurality of electrode lines of the touch sensor, a respective value associated with a second signal transmitted by the stylus at a second time that is different than the first time and sensed on each electrode line of the second plurality of electrode lines for determining a position of the stylus in the second direction, the second plurality of electrode lines oriented in the first direction, each of the second plurality of electrode lines being configured, in a first mode of operation, to sense the second signal transmitted by the stylus at the second time, each of the second plurality of electrode lines configurable to operate at another time in a second mode of operation in which the second plurality of electrode lines carry a drive signal; and
      estimating at least a two-dimensional position of the stylus tip based on interpolation of the respective values associated with the first signal sensed on each of the electrode lines of the first plurality of electrode lines oriented in the second direction and the respective values associated with the second signal sensed on each of the electrode lines of the second plurality of electrode lines oriented in the first direction;

a peak detector operable to measure a peak voltage of the sensed first signal on an electrode line of the first plurality of electrode lines;

a capacitor operable to store the measured peak voltage;

a current-to-voltage converter positioned between a connection pad associated with the electrode line of the first plurality of electrode lines and the peak detector, the current-to-voltage converter having at least one programmable gain setting; and a current conveyor positioned between the connection pad and the current-to-voltage converter, the current conveyor operable to provide low-impedance input.

2. The apparatus of claim 1, wherein the first and second signals are signal pulses.

3. The apparatus of claim 1, wherein:
the first plurality of electrode lines are sense lines;
the second plurality of electrode lines are drive lines; and
the operations further comprise toggling the drive lines between the first mode of operation and the second mode of operation.

4. The apparatus of claim 3, wherein:
the drive lines are arranged relative to the sense lines such that intersections of the drive lines and the sense lines form one or more capacitive nodes;
the sense lines are further operable to sense a third signal in response to the drive lines transmitting the signal in the driving mode; and
the operations further comprise measuring the change in capacitance of the one or more capacitive nodes due to sensing of the third signal.

5. The apparatus of claim 1, wherein the first signal is a square or sine wave.

6. The apparatus of claim 1, wherein estimating at least a two-dimensional position of the stylus tip based on interpolation of the respective values associated with the first signal sensed on each of the electrode lines of the first plurality of electrode lines oriented in the second direction and the respective values associated with the second signal sensed on each of the electrode lines of the second plurality of electrode lines oriented in the first direction comprises:
calculating a position in a first dimension by applying a parabolic equation to at least a subset of the respective values associated with the first signal sensed on each of the electrode lines of the first plurality of electrode lines oriented in the second direction; and
calculating a position in a second dimension by applying a parabolic equation to at least a subset of the respective values associated with the second signal sensed on each of the electrode lines of the second plurality of electrode lines oriented in the first direction.

7. The apparatus of claim 1, wherein the operations further comprise:
detecting, when the second plurality of electrode lines are configured to operate in the second mode of operation and when a capacitance increases at a capacitive node of the touch sensor, a presence of a stylus; and
detecting, when the second plurality of electrodes are configured to operate in the second mode of operation and when a capacitance decreases at a capacitive node of the touch sensor, a presence of a finger.

8. A non-transitory computer-readable medium comprising logic, the logic when executed by one or more processors configured to cause the one or more processors to perform operations comprising:

measuring, on each of a first plurality of electrode lines of a touch sensor, a respective value associated with a first signal transmitted by a stylus at a first time and sensed on each electrode line of the first plurality of electrode lines for determining a position of the stylus in a first direction, the first plurality of electrode lines oriented in a second direction that is different than the first direction, each of the first plurality of electrode lines being configured to sense the first signal transmitted by the stylus at the first time, the stylus having a stylus tip located at a position relative to the first plurality of electrode lines at the time of transmission of the first signal;

measuring, on each of a second plurality of electrode lines of the touch sensor, a respective value associated with a second signal transmitted by the stylus at a second time that is different than the first time and sensed on each electrode line of the second plurality of electrode lines for determining a position of the stylus in the second direction, the second plurality of electrode lines oriented in the first direction, each of the second plurality of electrode lines being configured, in a first mode of operation, to sense the second signal transmitted by the stylus at the second time, each of the second plurality of electrode lines configurable to operate at another time in a second mode of operation in which the second plurality of electrodes lines carry a drive signal;

estimating at least a two-dimensional position of the stylus tip based on interpolation of the respective values associated with the first signal sensed on each of the electrode lines of the first plurality of electrode lines oriented in the second direction and the respective values associated with the second signal sensed on each of the electrodes lines of the second plurality of electrode lines oriented in the first direction;

measuring, by a peak detector, a peak voltage of the sensed first signal on an electrode line of the first plurality of electrode lines, wherein a current-to-voltage converter is positioned between a connection pad associated with the electrode line of the first plurality of electrode lines and the peak detector, the current-to-voltage converter having at least one programmable gain setting;

storing, by a capacitor, the measured peak voltage; and providing, by a current conveyor positioned between the connection pad and the current-to-voltage converter, low-impedance input.

9. The non-transitory computer-readable medium of claim 8, wherein the first and second signals are signal pulses.

10. The non-transitory computer-readable medium of claim 8, wherein:
the first plurality of electrode lines are sense lines;
the second plurality of electrode lines are drive lines; and
the operations further comprise toggling the drive lines between the first mode of operation and the second mode of operation.

11. The non-transitory computer-readable medium of claim 10, wherein:
the drive lines are arranged relative to the sense lines such that intersections of the drive lines and the sense lines form one or more capacitive nodes;
the sense lines are further operable to sense a third signal in response to the drive lines transmitting the signal in the driving mode; and the operations further comprise measuring the change in capacitance of the one or more capacitive nodes due to sensing of the third signal.

12. The non-transitory computer-readable medium of claim 8, wherein the first signal is a square or sine wave.

13. A method comprising:
measuring, on each of a first plurality of electrode lines of a touch sensor, a respective value associated with a first signal transmitted by a stylus at a first time and sensed on each electrode line of the first plurality of electrode lines for determining a position of the stylus in a first direction, the first plurality of electrode lines oriented in a second direction that is different than the first direction, each of the first plurality of electrode lines being configured to sense the first signal transmitted by the stylus at the first time, the stylus having a stylus tip located at a position relative to the first plurality of electrode lines at the time of transmission of the first signal;
measuring, on each of a second plurality of electrode lines of the touch sensor, a respective value associated with a second signal transmitted by the stylus at a second time that is different than the first time and sensed on each electrode line of the second plurality of electrode lines for determining a position of the stylus in the second direction, the second plurality of electrode lines oriented in the first direction, each of the second plurality of electrode lines being configured, in a first mode of operation, to sense the second signal transmitted by the stylus at the second time, each of the second plurality of electrode lines configurable to operate at another time in a second mode of operation in which the second plurality of electrode lines carry a drive signal;
estimating at least a two-dimensional position of the stylus tip based on interpolation of the respective values associated with the first signal sensed on each of the electrode lines of the first plurality of electrode lines oriented in the second direction and the respective values associated with the second signal sensed on each of the electrodes lines of the second plurality of electrode lines oriented in the first direction;
measuring, by a peak detector, a peak voltage of the sensed first signal on an electrode line of the first plurality of electrode lines, wherein a current-to-voltage converter is positioned between a connection pad associated with the electrode line of the first plurality of electrode lines and the peak detector, the current-to-voltage converter having at least one programmable gain setting;
storing, by a capacitor, the measured peak voltage; and
providing, by a current conveyor positioned between the connection pad and the current-to-voltage converter, low-impedance input.

14. The method of claim 13, wherein:
the first plurality of electrode lines are sense lines;
the second plurality of electrode lines are drive lines; and
the method further comprises toggling the drive lines from the first mode of operation to the second mode of operation.

15. The method of claim 14, wherein the drive lines are arranged relative to the sense lines such that intersections of the drive lines and the sense lines form one or more capacitive nodes, the method further comprising:
sensing, by the sense lines, a third signal in response to the drive lines transmitting the signal in the driving mode; and
measuring the change in capacitance of the one or more capacitive nodes due to sensing of the third signal.

* * * * *